Figure 1:
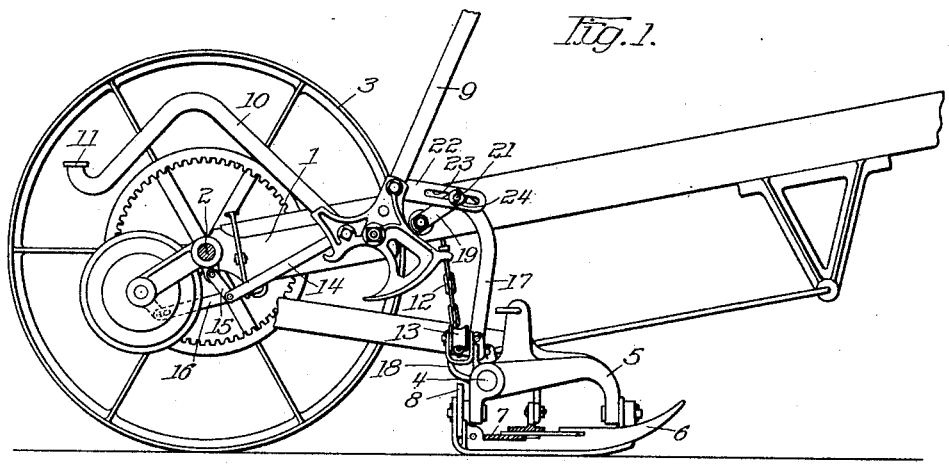

A. GRIEVES.
MOWING MACHINE.
APPLICATION FILED DEC. 22, 1913.

1,113,553. Patented Oct. 13, 1914.

Witnesses:
J. H. Daggett
E. W. Burgess

Inventor
Albert Grieves
by Chas. E. Lord
Atty.

UNITED STATES PATENT OFFICE.

ALBERT GRIEVES, OF SPRINGFIELD, OHIO, ASSIGNOR TO INTERNATIONAL HARVESTER COMPANY OF NEW JERSEY, A CORPORATION OF NEW JERSEY.

MOWING-MACHINE.

1,113,553. Specification of Letters Patent. Patented Oct. 13, 1914.

Application filed December 22, 1913. Serial No. 808,111.

*To all whom it may concern:*

Be it known that I, ALBERT GRIEVES, a citizen of the United States, residing at Springfield, in the county of Clark and State of Ohio, have invented certain new and useful Improvements in Mowing-Machines, of which the following is a full, clear, and exact specification.

My invention relates to mowing machines, and particularly to the mechanism for adjusting the cutting mechanism from a higher to a lower plane in that class of such machines wherein the cutter bar is hinge-jointed to a coupling frame which is pivotally connected to the main frame of the machine in a manner to rise and fall in following the inequalities of the surface of the ground, and wherein the cutter bar is designed to be adjusted from a horizontal or operative position to a substantially vertical one by means of a common form of hand lever mounted upon the frame and operatively connected with the coupling frame and finger bar by operating mechanism for the same.

It is usual in the above type of machines to provide a connection between the hand lever and the clutch mechanism, forming part of the power transmitting means, whereby the action of the latter is suspended when the cutter bar has reached a degree of elevation rendering any further operation of the cutting mechanism impractical. In such constructions it has been found, however, that, due to vibration of the parts and other causes, in lowering the cutter bar to operative position by allowing the hand lever to move forward, the cutter bar is often left at an unsafe angle when the clutch mechanism is operatively engaged, the result being the locking of the gear mechanism and disconnection of parts.

The object of my invention is to provide improved means whereby, when the hand lever is moved forward for the purpose of allowing the finger bar to move from a vertical toward a horizontal position and the clutch mechanism to engage operatively, the coupling frame is locked from descending until the cutter bar has assumed an angle making it safe to allow the cutting apparatus to be operatively connected with the power transmitting mechanism.

A further object of this invention is to provide improved means whereby the locking mechanism is positively controlled by the finger bar adjusting means.

I attain these objects by the provision of improved toggle mechanism controlled by the operating lever in an improved manner and locking and unlocking the parts in the desired sequence as hereinafter more fully set forth.

One embodiment which my invention may assume in practice is shown for purposes of illustration in the accompanying drawings, in which—

Figure 2:
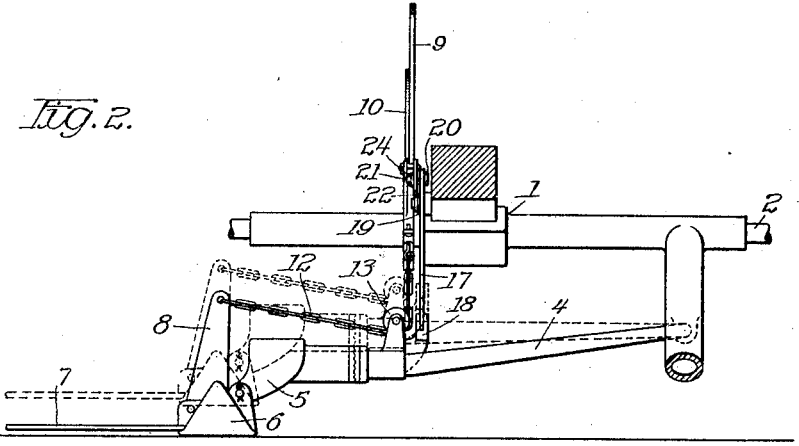
Figure 3:
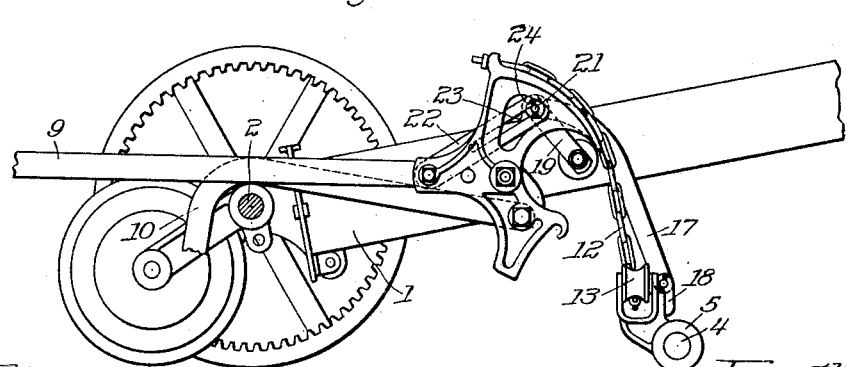

Figure 1 is a side elevation of parts of a mowing machine having my invention embodied in its construction; Fig. 2 is a front elevation of part of Fig. 1; Fig. 3 is a detached side elevation of the finger bar adjusting mechanism on an enlarged scale showing the coupling frame in an elevated position.

Referring to the drawings, wherein like reference characters denote the same parts throughout the several views, 1 represents the main frame of the machine, 2 a driving axle journaled therein, 3 one of the traction wheels, 4 a coupling frame having its stubbleward end pivotally connected with the main frame, 5 a coupling yoke carried at the grassward end of the coupling frame and permitted to rock axially thereon, 6 a shoe pivotally connected to the yoke 5, and 7 a finger bar secured to the shoe, the pivotal connection of the shoe with the yoke permitting the finger bar to be swung in a vertical plane from a horizontal or operative position to a substantially vertical one.

8 represents a vertically disposed arm secured to the shoe 6, 9 a hand lever pivotally mounted upon the main frame 1 and including the usual curved arm 10 and a foot lever attachment 11, the lever being connected with the arm 8 by means of a chain 12, which passes under a sheave 13 carried by the coupling frame 4.

14 represents a clutch shipping bar having its front end pivotally connected with the hand lever and its rear end operatively connected with the clutch shipping mechanism, as by means of a rocking arm 15 and link 16, whereby, when the finger bar has been raised to a predetermined angle, the clutch mechanism forming part of the power transmission mechanism between the traction wheels and the cutting apparatus is automatically disengaged and is not permitted to reëngage until the finger bar has been lowered to a practically operative position. In order to insure full efficiency of this part of the mechanism, I provide means for locking the coupling frame against a downward movement until the finger bar has reached a substantially horizontal position; the means including a link member 17 having its lower end pivotally connected with a bracket member 18 secured to the coupling frame, a sheave 13 being mounted in the bracket. The upper end of the link 17 is curved rearward and pivotally connected with the upper end of a short swinging link 19 by means of a pin 20, having a laterally projecting head 21, the lower end of the link 19 being pivotally connected with the main frame 1 eccentric with the axis of the hand lever 9.

22 represents a toggle controlling member having its rear end pivotally connected with the hand lever 9 and its front end provided with a longitudinally disposed slot 23 that slidably receives the head 21 of the pin 20, and 24 represents a retaining washer and pin that secure the associated parts in operative relation. When the hand lever is turned rearward to raise the finger bar and coupling frame, and during the initial movement thereof, the axis of the connection between the links 17 and 19 will move along the slot 23 until the coupling frame and finger bar have reached a predetermined angle, and then the toggle controlling member will swing the links 17 and 19 rearward until the hand lever 9 has reached its rearmost position with the axis of the pivotal connection of the links 17 and 19 in rear of a line drawn through the axis of link 17 upon the coupling frame and the axis of the link 19 upon the main frame, the mechanism in such position becoming self-locking as a toggle connection between the coupling frame 4 and main frame 1 and operative to secure the coupling frame in a raised position until the hand lever has been moved forward, permitting the finger bar to swing outward and downward to an operative position, and when the finger bar has reached an operative position the member 23 will break the toggle lock and permit the coupling frame to descend, the toggle controlling member 22 preventing any premature unlocking of the toggle mechanism until the hand lever has been moved forward to a predetermined angle, the position of the links 17 and 19 being wholly controlled by the member 22 as it is moved by the hand lever in either direction.

Having illustrated and described a preferred form of my invention, I do not wish it to be confined to the particular details of the structure shown herein for purposes of illustration, as it is understood that many minor changes may be made in the construction without departing from the spirit of my invention.

What I claim as new and desire to secure by Letters Patent is:

1. In a mowing machine, a main frame, a coupling frame pivotally connected therewith, a lever pivoted on said main frame and operatively connected with said coupling frame, a toggle connection between said main frame and said coupling frame and operative to lock said coupling frame in a predetermined position of adjustment, and a toggle controlling member pivotally mounted on said lever and engaging with said toggle mechanism.

2. In a mowing machine, a main frame, a coupling frame pivotally connected therewith, a lever pivoted on said main frame and operatively connected with said coupling frame, a toggle connection between said main frame and said coupling frame and operative to lock said coupling frame in a predetermined position of adjustment, and a slotted toggle controlling member pivotally mounted on said lever and engaging with said toggle mechanism.

3. In a mowing machine, a main frame, a coupling frame pivotally connected therewith, a lever pivoted on said main frame and operatively connected with said coupling frame, a toggle member having its lower end pivotally connected with said coupling frame, a second toggle member having one end pivoted upon said main frame and its opposite end pivotally connected with the upper end of said first toggle member, and a toggle controlling member pivotally mounted on said lever and having the upper ends of said toggle members slidable thereon.

4. In a mowing machine, a main frame, a coupling frame pivotally connected therewith, a lever pivoted on said main frame and operatively connected with said coupling frame, a toggle member having its lower end pivotally connected with said coupling frame, a second toggle member having one end pivoted upon said main frame and its opposite end pivotally connected with the upper end of said first toggle member, and a slotted toggle controlling member pivoted upon said lever and receiving the upper ends of said toggle members in a slidable manner.

5. In a mowing machine, a main frame, a coupling frame pivotally connected therewith, a lever pivoted on said main frame and operatively connected with said coupling frame, a toggle connection between said main frame and said coupling frame and operative to lock said coupling frame in a predetermined position of adjustment, and a toggle controlling member pivotally mounted on said lever and engaging with said toggle mechanism and operative to move said toggle mechanism into locking position when said coupling frame has reached a predetermined position of adjustment as controlled by said lever moving in one direction.

6. In a mowing machine, a main frame, a coupling frame pivotally connected therewith, a lever pivoted on said main frame and operatively connected with said coupling frame, a toggle connection between said main frame and said coupling frame and operative to lock said coupling frame in a predetermined position of adjustment, and a toggle controlling member pivotally mounted on said lever and engaging with said toggle mechanism operative to move said toggle mechanism into locking position when said coupling frame has reached a predetermined position of adjustment during movement of said lever in one direction and to break said toggle mechanism when said frame is in a predetermined position of adjustment during movement of said lever in an opposite direction.

In testimony whereof I affix my signature, in the presence of two witnesses.

ALBERT GRIEVES.

Witnesses:
P. M. HOLLENBECK,
M. M. MORROW.

Copies of this patent may be obtained for five cents each, by addressing the "Commissioner of Patents, Washington, D. C."